United States Patent
Espínola Estepa et al.

(10) Patent No.: US 9,459,467 B2
(45) Date of Patent: Oct. 4, 2016

(54) METHOD FOR DESIGNING AND MACHINING AN OPHTHALMIC LENS, METHOD FOR MANUFACTURING A BEVELLED LENS AND CORRESPONDING LENSES

(71) Applicant: INDO INTERNACIONAL S.A., Barcelona (ES)

(72) Inventors: Manel Espínola Estepa, Barcelona (ES); Alberto Lara Rodríguez, Barcelona (ES); Sara Chamadoira Hermida, Gondomar (ES); Glòria Casanellas Peñalver, Barcelona (ES); Pau Artús Colomer, Barcelona (ES); Javier Vegas Caballero, Barcelona (ES)

(73) Assignee: INDO OPTICAL S.L., Barcelona (ES)

( * ) Notice: Subject to any disclaimer, the term of this patent is extended or adjusted under 35 U.S.C. 154(b) by 16 days.

(21) Appl. No.: 13/798,748

(22) Filed: Mar. 13, 2013

(65) Prior Publication Data
US 2014/0176901 A1 Jun. 26, 2014

(30) Foreign Application Priority Data

Dec. 20, 2012 (ES) .................................. 201231983

(51) Int. Cl.
*G02C 7/02* (2006.01)
*G02C 7/06* (2006.01)

(52) U.S. Cl.
CPC .............. *G02C 7/024* (2013.01); *G02C 7/022* (2013.01); *G02C 7/027* (2013.01); *G02C 7/061* (2013.01)

(58) Field of Classification Search
CPC .. G02B 27/0012; G02C 7/022; G02C 7/024; G02C 7/027; G02C 7/028; G02C 7/041; G02C 7/06; G02C 7/061; G02C 7/063; G02C 7/065; G02C 7/068

USPC ........... 351/159.06, 159.07, 159.42, 159.46, 351/159.74, 159.75, 159.76, 159.77, 178
See application file for complete search history.

(56) References Cited

U.S. PATENT DOCUMENTS

| | | | |
|---|---|---|---|
| 8,770,748 B2 | 7/2014 | Dürsteler López et al. | |
| 2005/0105043 A1* | 5/2005 | Dreher et al. | 351/159 |
| 2012/0013846 A1 | 1/2012 | Dürsteler Lopez et al. | |

FOREIGN PATENT DOCUMENTS

| | | |
|---|---|---|
| DE | 10020576 A1 | 11/2001 |
| EP | 1830222 A1 | 9/2007 |

(Continued)

OTHER PUBLICATIONS

Chamadoira, et al (ES 2 350 557) EPO—Google English translation, 16 pages.*

(Continued)

*Primary Examiner* — Scott J Sugarman
*Assistant Examiner* — Gary O'Neill
(74) *Attorney, Agent, or Firm* — Staas & Halsey LLP (57) ABSTRACT

A central area of a lens is defined with a central perimeter coinciding with a perimeter of a frame, a temporal line divides the central area into a nasal area and a temporal area, a useful perimeter is formed from the nasal area and the temporal line, a useful area is delimited by the useful perimeter, and a prescription is determined for the user. The temporal line is outside a cone with at least a 30° opening, an apex of which is in a center of rotation of a user's eye, which is an optical axis. A lens thickness is optimized according to the thickness of the perimeter of the nasal area. Subsequently a transition area is defined extending between the useful perimeter and an external perimeter of the lens.

22 Claims, 8 Drawing Sheets

(56) References Cited

FOREIGN PATENT DOCUMENTS

| EP | 2236244 | 10/2010 |
| ES | 2323935 | 7/2009 |
| ES | 2350557 | 1/2011 |
| FR | 2924824 | 6/2009 |
| WO | WO 01/84215 A1 | 11/2001 |
| WO | WO 2006/084771 A1 | 8/2006 |

OTHER PUBLICATIONS

Spanish Search Report dated Oct. 18, 2013 in corresponding Spanish Patent Application No: 201231983.
Delphion English Abstract of German Publication No. 10020576 A1, Published Nov. 15, 2001.

* cited by examiner

METHOD FOR DESIGNING AND MACHINING AN OPHTHALMIC LENS, METHOD FOR MANUFACTURING A BEVELLED LENS AND CORRESPONDING LENSES

CROSS-REFERENCE TO RELATED APPLICATIONS

This application claims the benefit under 35 U.S.C. §119 of Spanish Patent Application No. P201231983 filed on Dec. 20, 2012, which is hereby incorporated in its entirety into this application.

FIELD OF THE INVENTION

The invention relates to a method for designing an ophthalmic lens having one concave face and one convex face and an external perimeter, where the external perimeter has a thickness within a pre-established range. The invention also relates to a method for machining an ophthalmic lens as well as a method for manufacturing a bevelled lens.

The invention also relates to finished ophthalmic lenses.

In this specification and claims the nomenclature of standard ISO 13666 has been used, which establishes the following definitions:
- semifinished lens blank: piece of preshaped material that only has one finished optical surface,
- finished lens: lens where the two sides have definitive optical surfaces, this finished lens can be bevelled (to adjust its perimeter to a certain frame) or not.

In this specification and claims it is considered that the term "finished lens" always refers to a non-bevelled lens. To refer to bevelled lenses, the term "bevelled finished lens" is specifically used.

BACKGROUND ART

Various techniques are known that make it possible to optimize the thickness of ophthalmic lenses. So for example, document ES P200900849 describes a method for optimizing ophthalmic lenses taking into account the frame selected by the user. Document ES P201031037 describes methods for optimizing the distribution of aberrations in progressive ophthalmic lenses, also taking into account the frame selected by the user.

However, there is still the need for techniques that allow manufacturing lenses that are intended to be mounted in highly wrapped frames, particularly in the case of corrective ophthalmic lenses, in other words, which must comply with some prescription.

SUMMARY OF THE INVENTION

An aim of the invention is to overcome these drawbacks. This purpose is achieved by a method for designing an ophthalmic lens including the following steps:

[a.i] taking physiological data and prescription data of the user's optical correction,

[a.ii] selecting a frame, taking the data of said frame, including the data of the perimeter of said frame, and taking the data of the positioning of the lens with respect to the user's eye, taking into account the selected frame,

[b] defining a central area that has a central perimeter which coincides with the perimeter of the selected frame,

[c] defining a temporal line that divides the central area into a nasal area and a temporal area, where the temporal line is outside the intersection between the convex face and a cone with an opening angle of at least 30°, the apex of which is in the center of rotation of the user's eye and which axis corresponds to the optical axis,

[d] defining a useful perimeter formed by the combination of the nasal part of the central perimeter and the temporal line, and a useful area delimited by the useful perimeter,

[e] establishing some permissible thickness values for the central perimeter,

[f] defining a surface to be machined on one of the concave and convex faces, so that the concave face and the convex face, together, are such that they comply with a certain, pre-established ophthalmic prescription in the useful area,

[g] positioning the surface to be machined, provided on one of the concave and convex faces, with respect to the other of the concave and convex faces, so that the surface to be machined and its positioning with respect to the other of the concave and convex faces determines the thickness of the lens along the useful perimeter of the useful area, where each and every one of the points in the nasal part of the central perimeter has a thickness that complies with the permissible thickness values,

[h] defining a transition area with a transition surface that extends between the useful perimeter of the useful area and the external perimeter, where the transition surface extends as a continuation of the surface to be machined and extends as far as the external perimeter, and where the transition surface is continuous and its derivative is continuous on all its points, including the joining line between the transition surface and the surface to be machined, and where the transition surface complies with the permissible thickness values in step [e] above, on the points of the temporal part of the central perimeter.

Effectively, in a highly wrapped lens there is a part thereof, in the temporal area, which is not really used by the user. However, with the known design techniques, this non-used part can be the cause of high thicknesses, either in the actual temporal area, particularly on the actual edge of the lens (in the case of negative lenses) or in the center of the lens (in the case of positive lenses). Effectively, the method described in the above-cited ES P200900849 uses the frame as a reference, whereby, in the case of highly wrapped frames, the optimization performed may not be sufficient to obtain satisfactory results. However, with the method according to the invention it is not simply the frame that is used as a reference, since consideration is given to the fact that the lens usually has an area that is not used by the user, and that this area is particularly large in highly wrapped frames. Therefore, the central area (which is the part that will be included in the frame) is divided into a nasal area and a temporal area by means of a temporal line. This division is made taking into account the fact that the part of the lens that is really used by the user is the nasal area. To do this, the convex face of the lens is intercepted with a cone that has an opening angle of at least 30°, the apex of which is in the center of rotation of the user's eye and which axis corresponds to the optical eye. Effectively, a user usually turns his head if he has to divert his line of vision more than 30°, or, in other words, the user usually uses a field of vision of 30° or less. Therefore, the temporal area must include at least this field of vision. Once the useful area has been defined, it is observed that the rest of the lens, including the part of the lens that lies in the frame, but within the temporal area, is a part of the lens with optical properties (in the sense of complying with a certain prescription) that are no longer relevant. Therefore, the lens thickness can be optimized taking this fact into account, that is, by optimizing the lens thickness taking into account the fact that, although all the points on the central perimeter must comply with certain thicknesses requirements, those corresponding to the temporal area are part of a surface that does not have to comply with requirements from a certain prescription. This transition surface must be simply a continuation of the surface to be machined, it must be continuous and with a continuous derivative on all its points, including the joining line between the transition surface and the surface to be machined, and it must comply with the permissible thickness values in step [e] above, on the points of the temporal part of the central perimeter.

Generally, the temporal line can be any shape. However, it is preferable that it has an arched circumference or that it is parallel to the temporal edge of the central area, that is defined by the frame.

Preferably the cone has an opening angle greater than 40°, preferably greater than 50°. Effectively, although the 30° opening angle is the one that guarantees that the field of vision the user normally uses lies within it, greater angles nevertheless also admit the field corresponding to peripheral vision, which leads to increased user comfort.

Advantageously in following step [g], it is analyzed whether it is possible to move the temporal line in the temporal direction while still complying with the permissible thickness values and, if so, the temporal line is moved in the temporal direction. In fact, in step [g] two fairly different criteria are followed depending on whether the lens is a positive or negative lens (and the "mixed" strategies are followed for progressive lenses where positive and negative areas coexist):

In the case of positive lenses the greater lens thickness is usually in the center thereof. When trying to reduce the lens thickness to a minimum, the problem is that on the edge of the lens the thickness may be too small or even negative. In these cases, care must be taken so that the thickness of the useful perimeter is within the permissible thickness values. In these cases the most critical point is usually the point of the useful perimeter that is furthest from the optical center. If this point is in the nasal part of the central perimeter, this means it is possible to extend the radius of the cone of useful vision (in other words, the temporal line can be moved in the temporal direction) without compromising the lens thickness, because this thickness has derived from a point of the nasal part of the central perimeter. This way it is possible to maximize the useful area of the lens without affecting the minimum thickness obtained.

In the case of negative lenses the greater thickness usually occurs in the lens contour. In the optical center of the lens the thickness is usually minimal and must not be less than a minimum value, essentially for mechanical purposes. In this case there will be the maximum thicknesses on the points of the useful perimeter furthest from the optical point. When the negative lens has a high power, then it is possible that the desired maximum thickness is reached before leaving the cone of useful vision. In this case, the greater thicknesses must be tolerated within the area of useful vision, if it is not desirable to limit the area of useful vision (it must be taken into account that in cases of high negative power lenses, a smaller radius of useful vision is permissible, because the user's angle of real vision is increased by passing through the lens). If, on the other hand, the negative lens has a low power, then probably the maximum permissible thicknesses are reached outside the cone of useful vision. This allows increasing the cone of useful vision without noticeably affecting the aesthetics of the bevelled lens.

Preferably the area of transition between the temporal line and the central perimeter is calculated by requiring that it be continuous and with continuous derivatives, and that on all its points it has a thickness that is within the pre-established range.

Advantageously, in the specific case of progressive ophthalmic lenses, where the lens comprises an area of far vision, an area of near vision and a corridor that extends between both, where between the area of far vision and the top edge of the lens there extends a top area and between the area of near vision and the bottom edge of the lens there extends a bottom area, the method includes a step of optimizing said lens that includes the following substeps:

[i] calculating the objective values of the prescription power and astigmatism for the area of far vision, the area of near vision and the corridor, according to the user's physiological and prescription data and, optionally, the positioning data,

[ii] generating or selecting a predesigned lens, where the predesigned lens has certain lateral aberration values, preferably astigmatism associated with the progression of the power of the lens, in the top and bottom areas,

[iii] defining an area to be optimized, defined from the central perimeter, and preferably in the useful area, and an external area outside the central perimeter, and locating the area to be optimized in the lens, where the central perimeter divides the top area into a top outside area and a top inside area and the bottom area into a bottom outside area and a bottom inside area,

[iv] redistributing at least one of the lateral aberrations of the lens, preferably the astigmatism associated with the progression of power, where during redistribution, the lateral aberration of the lens is distributed around the outside area allowing at least one of the top outside and bottom outside areas, to adopt higher vales to the ones it had in the predesigned lens.

Effectively, normally conventional progressive lenses (and the predesigned lenses that are usually used in the design of conventional progressive lenses) have been calculated without taking into account the frame that will be used by the user. As a consequence of this, the exact location of the useful area is unknown. Consequently, conventional lenses (and conventional progressive lenses) try to keep the top and bottom areas with lateral aberration values, particularly for astigmatism associated with progression, as low as possible because the whole of that part of said top and bottom areas that will eventually lie within the useful area, will be an area used frequently by the user and its size is not known beforehand, and therefore the areas have to be extended to the total diameter of the lens to cover any possible frame shape. Therefore, the presence of lateral aberrations at non-appreciable values in these areas would be a source of discomfort for the user if eventually they were to lie within the perimeter of the user's frame. However, in this invention it is considered that, while in the top inside and bottom inside areas the presence of lateral aberrations is strongly not recommended (and must be reduced to a minimum), on the other hand in the top and bottom outside areas there can be any lateral aberration value (and, in fact, any aberration) because these areas will eventually be removed during bevelling, and therefore their optical properties are completely irrelevant. On the other hand, when redistributing the lateral aberrations (preferably the distribution of astigmatism associated with progression) allowing the top and bottom outside areas to adopt values higher than those of the predesigned lens, it is possible that other parts of the lens, specifically the central area and, particularly, within the useful area, lateral aberration values are reduced and/or softened, which improves user comfort.

In this description and claims a predesigned lens is understood to be a lens that is taken as a starting point for the optimization step according to the invention. It is a lens that has been calculated by any method other than that of this invention, preferably without taking into account the frame chosen by the user, and very preferably without taking into account the perimeter of the frame. The predesigned lens may have been calculated beforehand, so that the optician can have a plurality of predesigned lenses available from which he can choose the most suitable when performing the optimization according to the invention, or it can be a lens that is generated (calculated) when performing the optimization according to the invention.

It is not necessary that the optimization process simultaneously affects both areas (the top outside area and the bottom outside area), because an optimization process can be performed that only affects one of them.

Generally, the optimization can include treating one of the lateral aberrations (preferably the astigmatism associated with the progression of the power of the lens) or more than one. Therefore, when this specification and claims refer to the chosen lateral aberration, it must be understood that it also includes the case when more than one has been chosen.

Another object of the invention is a method for machining an ophthalmic lens including a design method according to the invention and a step for machining the surface to be machined and the transition surface.

Preferably the machining method includes a step of concealing aberrations in the area between the temporal line and the temporal part of the central perimeter. Although this area must even be outside the field of peripheral vision, it is better to modify its transparency properties, so as to avoid any possible annoyance caused by rolling and/or deforming the image that the user can see. It is desirable that the user perceives this optically distorted area as non-useful. It is particularly interesting that, on the inside of the lens the user perceives this area as non-useful (as part of the frame) while on the outside of the lens there is still the aesthetic impression of a large wrapped lens, apparently useful all over its surface. In fact, the area between the temporal line and the temporal part of the central perimeter could even be free (or almost free) of aberrations but, at any event, it is not suitable for the user. Therefore it is advantageous to include a step of wholly or partially disabling the formation of images in the area between the temporal line and the temporal part of the central perimeter. In other words, whether or not this part of the lens has aberrations, it is advantageous that a treatment be applied to it that prevents the formation of optically correct images.

This is achieved advantageously when the step of concealing aberrations is a non-polish, tint, coating, frosting or a combination thereof, applied to any of the two lens faces.

Preferably the frosting is performed by modifying the surface of the lens or the surface of a lens coating by mechanical action, such as for example, mechanical abrasion, and advantageously by sanding with abrasive particles, milling, drilling or punching.

An advantageous alternative for concealing aberrations is achieved by superficially ablating the lens using impulses generated with a collimated energy source, such as for example a laser. It is also possible to modify the internal optical properties of the lens by impulses generated with a collimated energy source. Preferably cavities are made inside the lens by impulses generated by a laser.

Another object of the invention is a method for manufacturing a bevelled lens, including a method for manufacturing an ophthalmic lens according to the invention and a bevelling step according to the central perimeter.

A further object of the invention is a finished ophthalmic lens that has one concave face and one convex face and an external perimeter, where the external perimeter has a thickness within a pre-established range, characterized in that:

[a] it has a useful area where the concave face and the convex face are such that they comply with a specific, pre-established ophthalmic prescription and where one of the concave and convex faces defines a machined surface, where the useful area has a useful perimeter that is made up of the combination of a nasal part of a central perimeter, which coincides with the perimeter of a specific, pre-established frame that defines a central area, and a temporal line, which divides the central area into the nasal area and the temporal area where the temporal line is outside the intersection between the convex face and a cone with a 30° opening angle, the apex of which is in the center of rotation of the user's eye and which axis corresponds to the optical axis, and

[b] it has an outer transition area that joins the useful perimeter of the useful area to the external perimeter, where the transition area includes a transition surface that extends as a continuation of the machined surface and extends as far as the external perimeter, and where the transition surface is continuous and its derivative is continuous on all points, including the joining line between the transition surface and the machined surface.

Preferably the lens has, in addition, said area between said temporal line and the temporal part of said central perimeter with the concealed aberrations, whereby the user does not use this part of the lens to look through it, and neither does it negatively affect his peripheral vision.

Advantageously the area with the concealed aberrations is an area that is non-polished, tinted, coated, frosted or a combination thereof.

Preferably the lens is a progressive lens, including:
  an area of far vision, an area of near vision and a corridor that extends between the area of far vision and the area of near vision, where between the area of far vision and the top edge of the lens there extends a top area and between the area of near vision and the bottom edge of the lens there extends a bottom area,
  an area to be optimized, defined from the central perimeter, and preferably in the useful area, and an external area outside the central perimeter, and locating the area to be optimized within the lens, where the central perimeter divides the top area into a top outside area and a top inside area and the bottom area into a bottom outside area and a bottom inside area, where at least one of the top outside area and the bottom outside area has an astigmatism associated with the progression of the power of the lens, higher than 0.25 Dp.

Effectively, as mentioned above, the usual methods try to make the lateral aberrations as small as possible in the top and bottom areas, and therefore the objective values are usually 0. Also, in the conventional methods the top and bottom areas are not divided according to the frame (which, when a useful area is defined, divides them into a top outside, top inside, bottom outside and bottom inside area), whereby these subareas do not receive a differentiating treatment. When a predesigned lens is selected, these 4 areas have null or very small lateral aberration values. When non-null objective values (or even clearly high values, such as for example an astigmatism associated with the progression of the power of the lens higher than 0.25 Dp) are given to the outside areas (top outside and/or bottom outside), a redistribution of the lateral aberrations is forced around the whole lens, causing a reduction and softening of the lateral aberrations in the useful area, particularly in the temporal and nasal areas.

BRIEF DESCRIPTION OF THE DRAWINGS

Other advantages and characteristics of the invention are appreciated from the following description, where, in a non-limiting manner, some preferred embodiments of the invention are described, with reference to the attached drawings, wherein.

DETAILED DESCRIPTION

Figure 1:
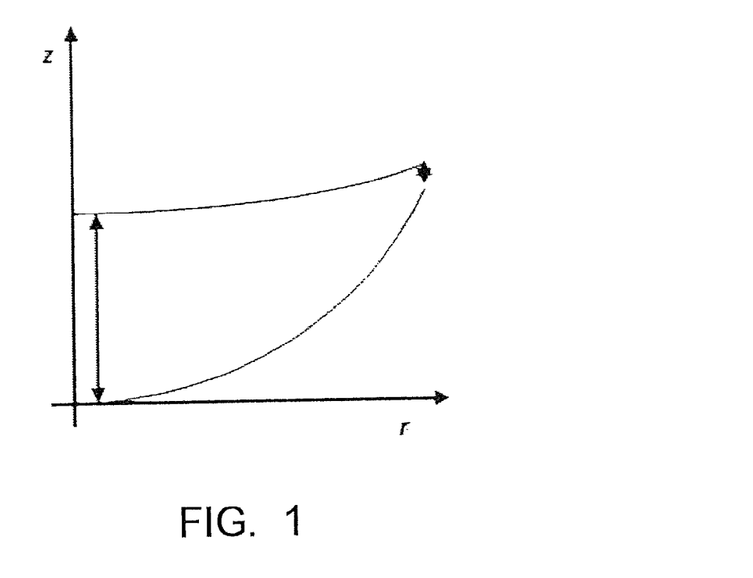
FIGS. 1 and 2, a diagrammatic view of a cross section of a positive lens and a negative lens, respectively.
Figure 2:
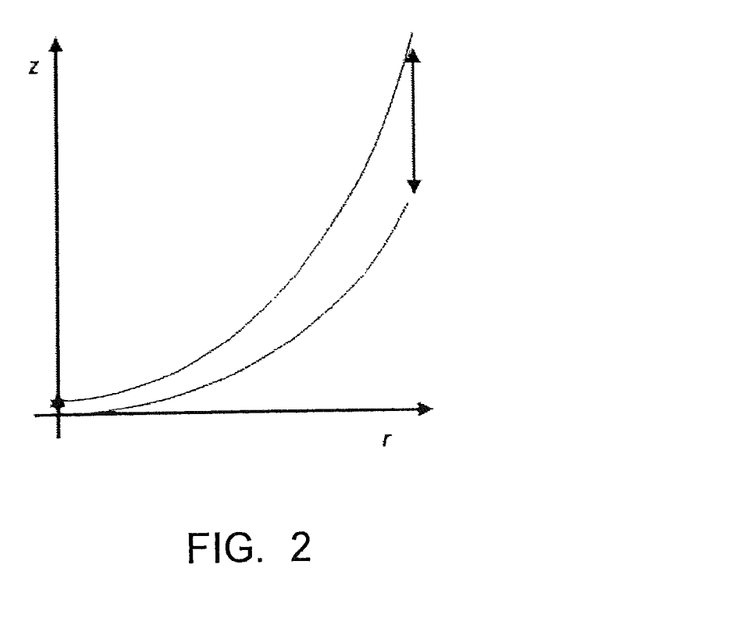
Figure 3:
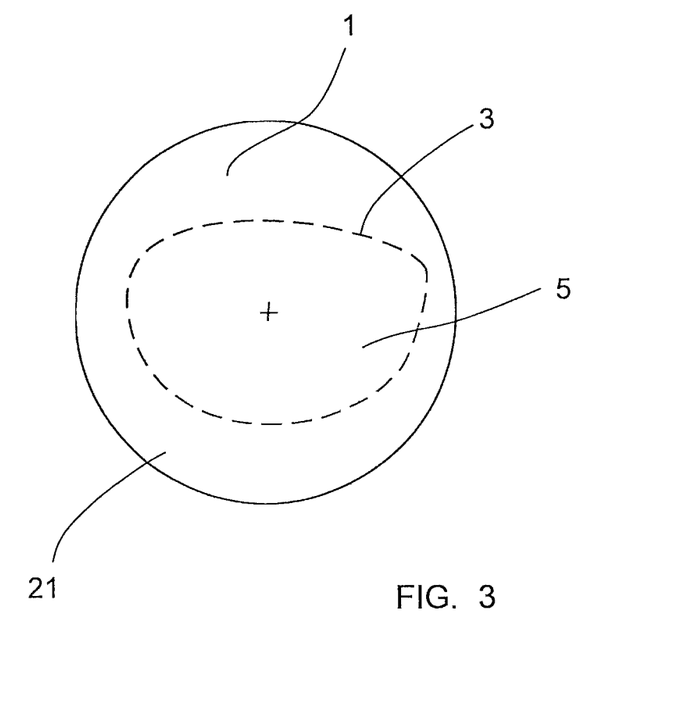
FIG. 3, a diagrammatic view of a semifinished lens blank or finished lens with the perimeter of a frame superimposed on the surface.

FIGS. 1 and 2 show a diagrammatic view of the problem of lens thicknesses, both in the case of positive lenses, where the maximum thickness is in the optical center 9 of the lens, and on the edges thereof the problem lies in the lack of material, as in the case of negative lenses, where the thickness in the center of the lens cannot be below a minimum value, while the thickness on the edges grows as we move away from the center of the lens. In progressive lenses the real situation is more complex, because both effects may coexist, and they may be different in different areas of the perimeter, but conceptually the problem remains the same, and the proposed way of resolving it in this invention is also the same. For its part, FIG. 3 shows a lens 1 (semifinished lens blank or finished lens) on which the perimeter of the user-selected frame, which defines the so-called central perimeter 3 and the central area 5, has been superimposed.

Figure 4:
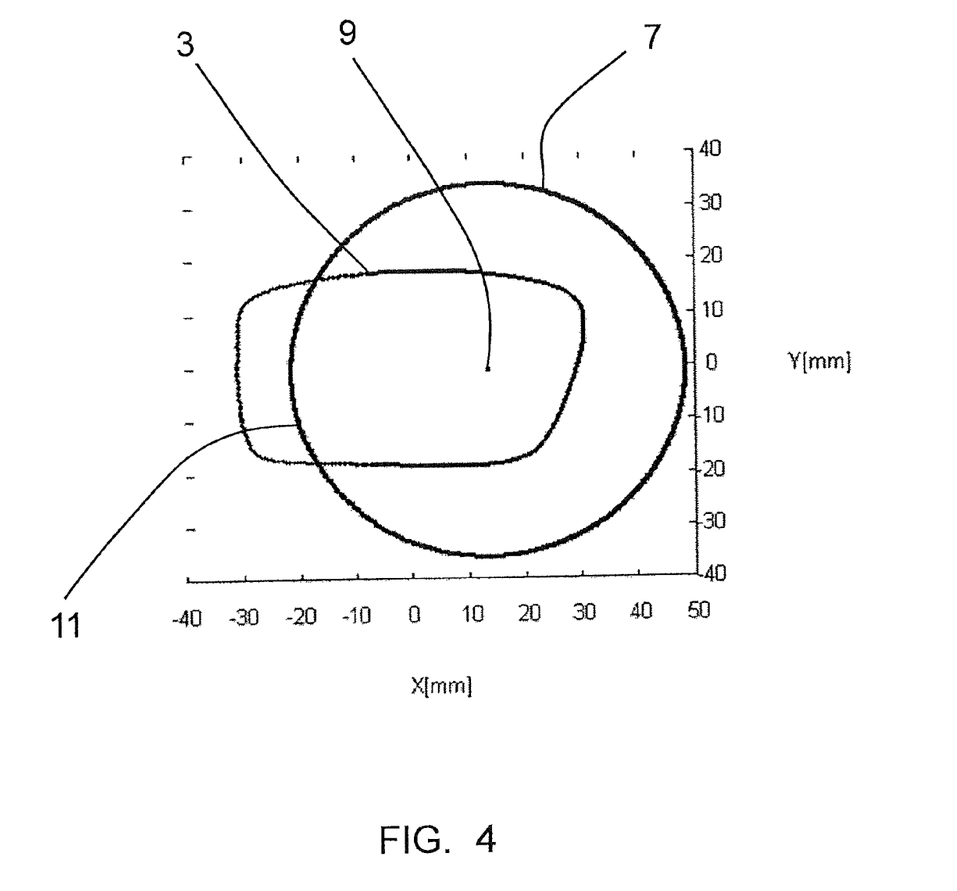
FIG. 4, a diagram showing the superimposition of contours between the central perimeter (the original frame) and the cone of useful vision.
Figure 5:
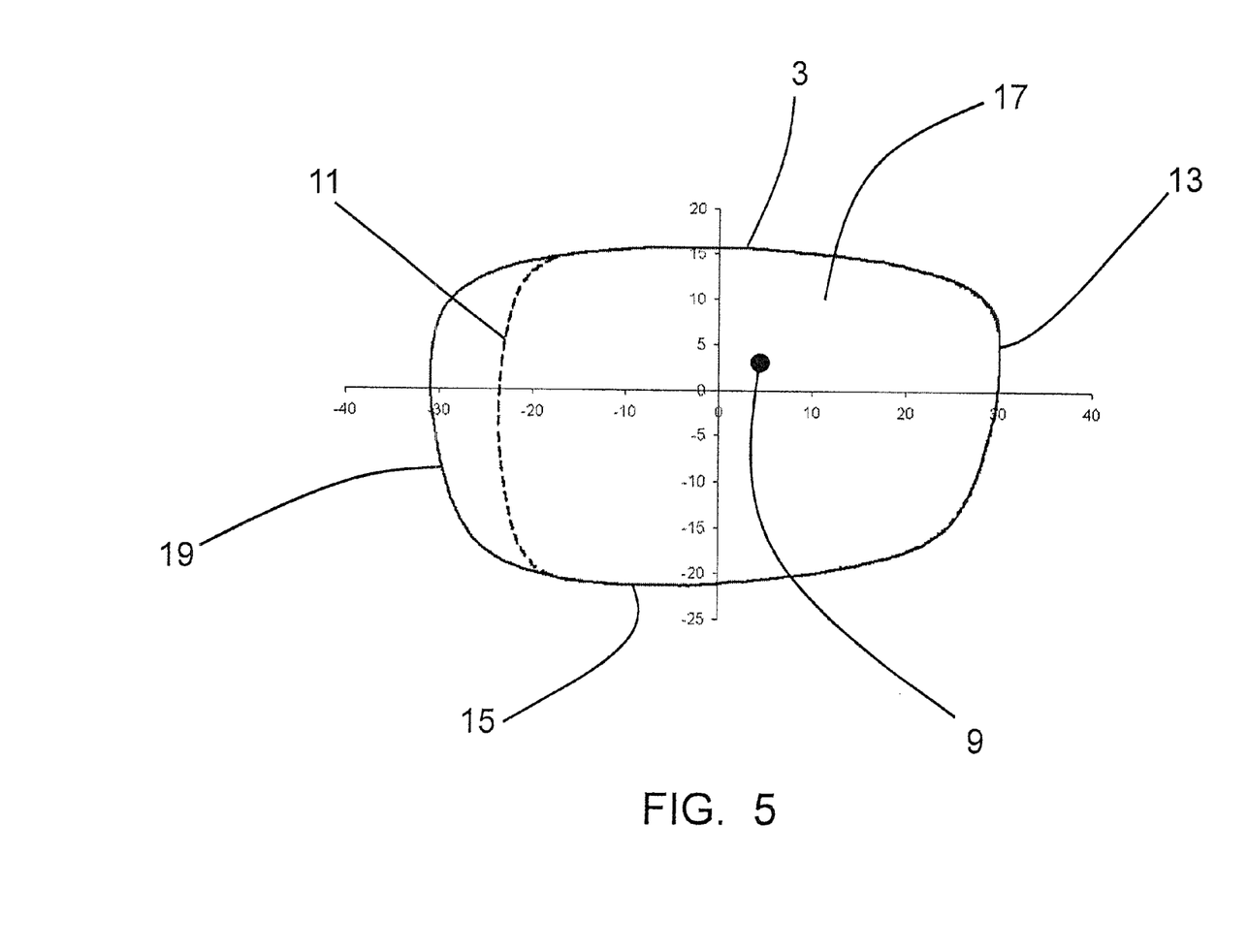
FIG. 5, a diagram showing the central perimeter and the useful perimeter.

FIG. 4 shows central perimeter 3 defined by a specific frame, and the user's cone of useful vision 7. This cone of useful vision 7 is centered in the optical center 9 of lens 1 (strictly speaking, what is actually centered in optical center 9 is the intersection between the cone of useful vision 7 and the surface of the lens, which forms the circumference shown in FIG. 4). The cone of useful vision 7 will have, in each case, a pre-established value that could be exactly the value really corresponding to the user's field of useful vision or it could be a greater value, as already mentioned. In the example in FIG. 4, the nasal area would be at the right of the figure, while the temporal area would be at the left of the figure. FIG. 5 shows how, from central perimeter 3 and from the cone of useful vision 7, temporal line 11 can be defined (which, in this particular case is directly the section of the cone of useful vision 7 that remains inside central area 5, with the ends suitably rounded so that they link continuously with nasal part 13 of central perimeter 3). The unit made up of nasal part 13 of central perimeter 3 and temporal line 11 forms the so-called useful perimeter 15 inside which there is useful area 17. Temporal part 19 of central perimeter 3 remains in transition area 21, although it still defines part of the perimeter of the frame.

Figure 6:
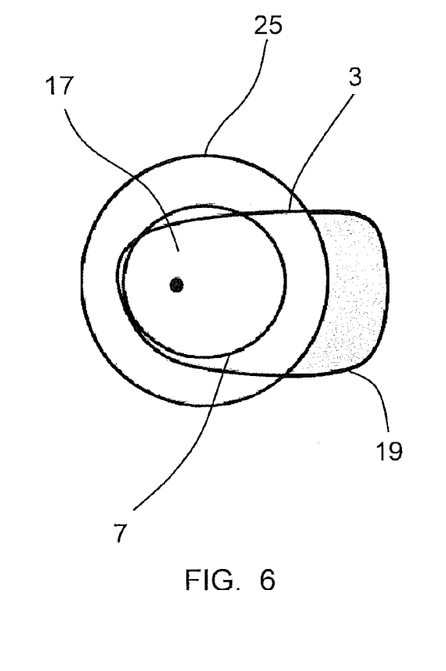
FIG. 6, a diagram showing a case of a high power negative lens.
Figure 7:
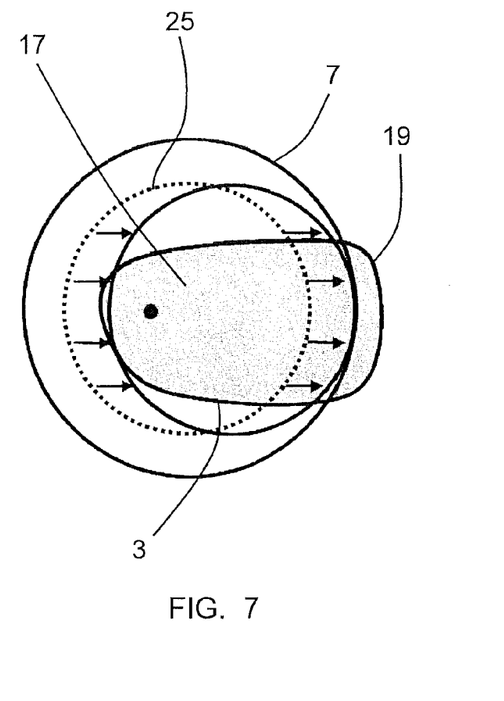
FIG. 7, a diagram showing a case of a low power negative lens.

FIG. 6 shows the case of a high power negative lens. Reference number 25 indicates an isoline corresponding to a maximum desired thickness. It is observed that the cone of useful vision 7 is further in the temporal direction. Therefore, in the lens the desired maximum thickness value is reached inside useful area 17. However, in FIG. 7, showing the case of a low power negative lens, isoline 25 is further in the temporal direction than the cone of useful vision 7. This makes it possible to move temporal line 11 (or the cone of useful vision 7) in the temporal direction so that useful area 17 is increased without compromising the aesthetics (or the weight) of the lens.

Figure 8:
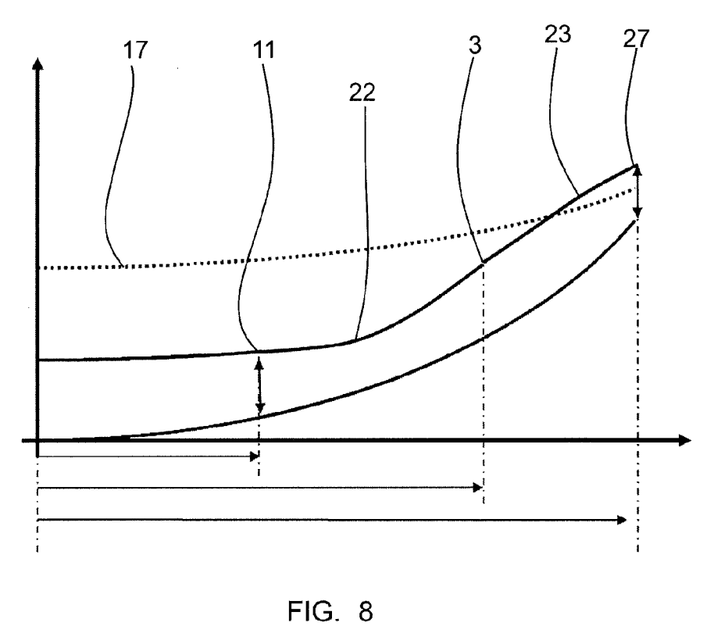
FIGS. 8 and 9, a diagrammatic view of a cross section of a positive lens and a negative lens according to the invention.
Figure 9:
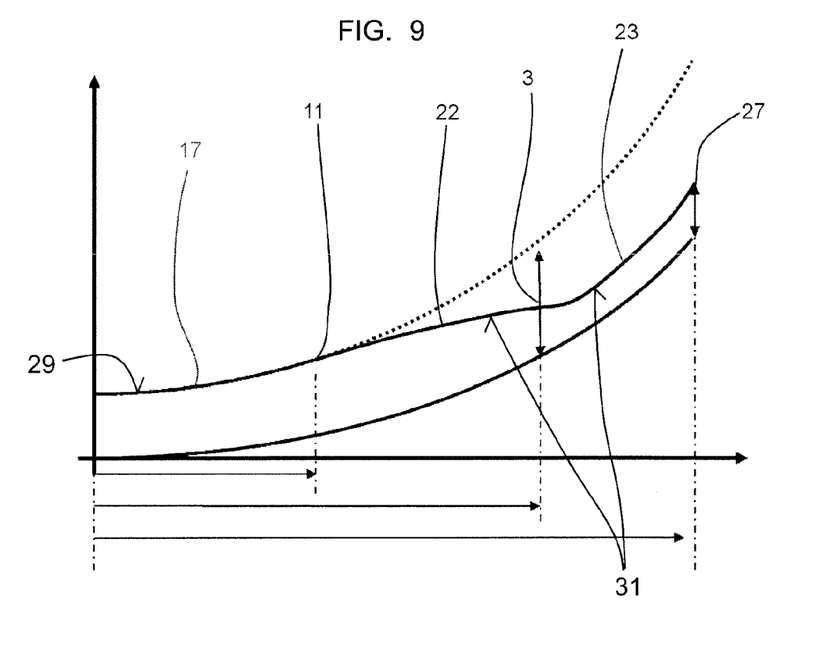

FIGS. 8 and 9 show diagrammatic views of a cross section of a positive lens and a negative lens according to the invention, where useful area 17, temporal line 11 (which is part of useful perimeter 15), the transition area inside central area 22 (in other words, the part of transition area 21 between temporal line 11 and central perimeter 3), central perimeter 3 (which, in this section, is temporal part 19 thereof), and the transition area can be seen outside central area 23 that extends as far as external perimeter 27 of lens 1. In both cases the surface to be machined 29 (which in these examples is the concave surface) has been positioned by optimizing the thickness of useful perimeter 15 in the case of FIG. 8, or of the center in the case of FIG. 9. In the case of FIG. 8, the thickness must be such that it allows an appropriate evolution of transition surface 31 as far as the thickness required in central perimeter 3 (the perimeter of lens 1) without, at any moment, the thickness of the transition area within central area 22 being outside a pre-established range. It must be taken into account that the transition area within central area 22, although it is not valid optically, must have minimum mechanical characteristics, as physically it will be part of the bevelled lens that will remain within the frame. Therefore, it must comply with mechanical requirements which, for example, will not be required in the transition area outside central area 23, because this is a part that will be removed during the bevelling. Both figures also represent, with dotted lines, the "original" concave surface (for example a surface calculated by any conventional method), in other words, without having been modified using the method according to the invention.

Figure 10:
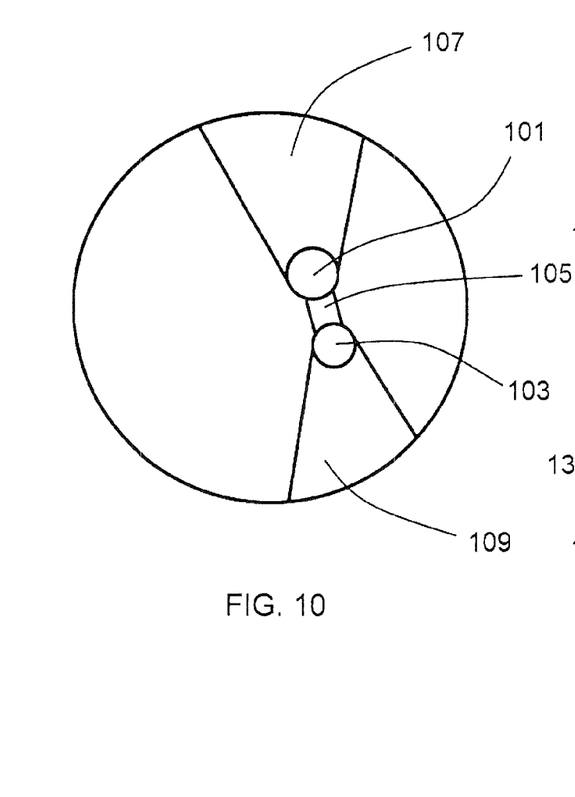
FIGS. 10 and 11, diagrams of progressive ophthalmic lenses with the various areas mentioned in the stage of optimization of progressive lenses.
Figure 11:
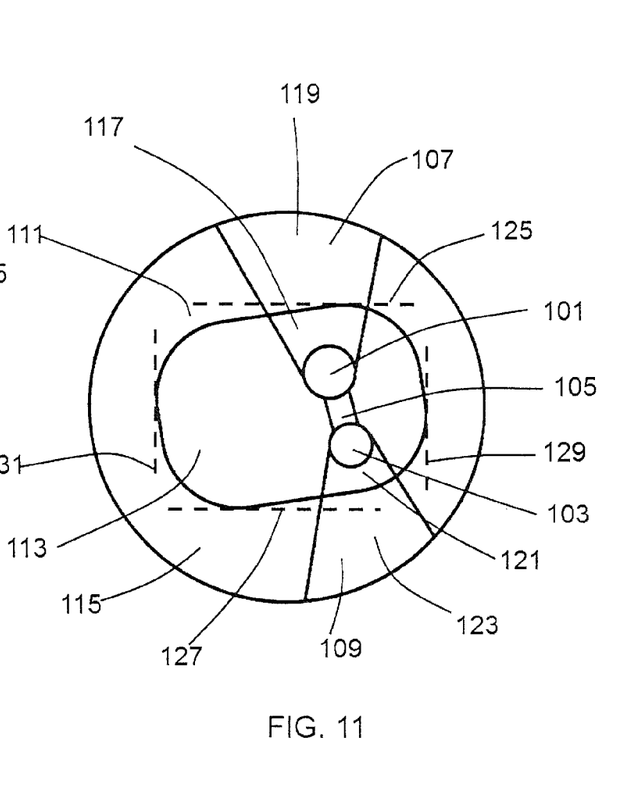

FIG. 10 shows the areas of far vision 101, near vision 103 and corridor or passageway 105, which are the conventional areas of the progressive lenses of the state of the art. Above the area of far vision 101 there extends top area 107, and under the area of near vision 103 there extends bottom area 109. FIG. 11 includes perimeter 111 of a frame which, once positioned correctly on the lens, defines an area to be optimized 113 and an outside area 115, which is the area that will be removed during the bevelling stage. The part of top area 107 included in the area to be optimized 113 is top inside area 117, while the part of top area 107 included in outside area 115 is top outside area 119. Bottom inside area 121 and bottom outside area 123 can be defined similarly. In addition, FIG. 11 shows, with dotted lines, the lines that determine the top, bottom, nasal and temporal maximums, that is the top 125, bottom 127, nasal 129 and temporal 131 dimensions of the area to be optimized 113.

Generally the shape of the area to be optimized 113 coincides with the surface defined by perimeter 111 of the frame (in other words, central area 5), but it does not have to be like this. The area to be optimized 113 can be other shapes which, although they are defined by perimeter 111 of the frame, do not coincide exactly. So, for example, the area to be optimized 113 can be defined as the one defined by the rectangle formed by the top 125, bottom 127, nasal 129 and temporal 131 dimensions. Or the area to be optimized 113 can be defined as another simple geometric shape that is approximate to the area of perimeter 111 (inscribed rectangles, inscribed ellipses, etc.). These simple geometrical shapes can be of interest in various cases, such as for example to simplify and accelerate the optimization calculations or to perform optimization in those cases where the complete data on the perimeter of the frame are not available. It is particularly advantageous that the area to be optimized 113 is useful area 17.

Figure 12:
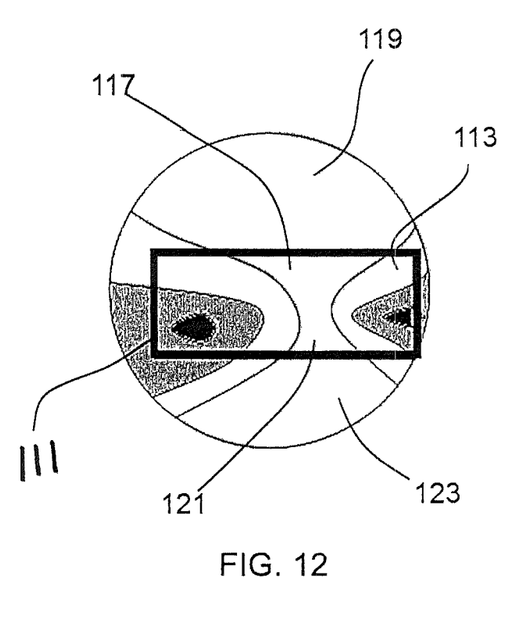
FIGS. 12, 13 and 14, diagrammatic views of distribution maps of astigmatism associated with progression, as examples of lateral aberrations, showing the movement of the astigmatism associated with progression according to the method of the invention.
Figure 13:
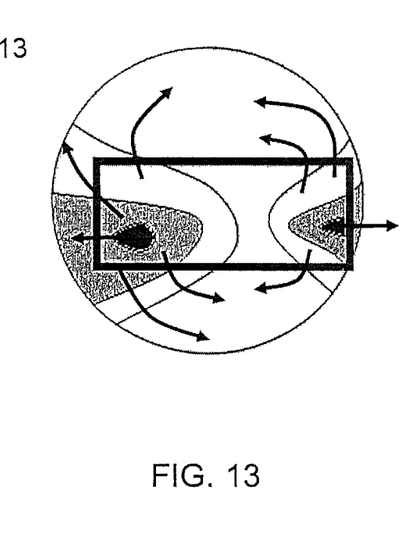
Figure 14:
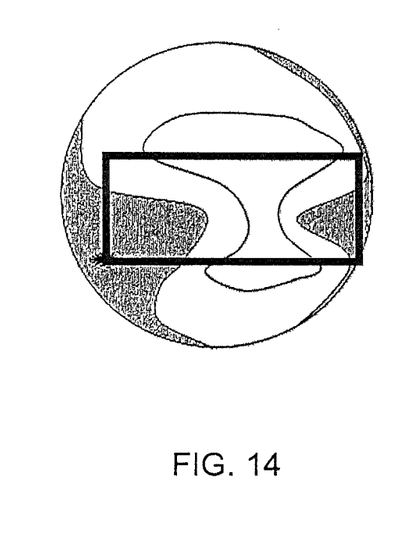

As already explained above, the basic aim of the invention is to avail of the area that will lie outside the frame (in other words, outside area 115) once the lens has been bevelled. This way lenses with smaller lateral aberrations can be obtained (and, particularly, with smaller astigmatism associated with progression), which makes them more comfortable for users irrespective of the type of progressive design chosen, which will not vary in the areas that are important for vision (area of far vision 101, area of near vision 103 and corridor 105). The examples in FIGS. 12, 13 and 14 show cases where the chosen lateral aberration is the astigmatism associated with progression. However, the results and conclusions can be generalized for any other lateral aberration. FIG. 12 shows astigmatism associated with progression of a standard design. On the finished lens, perimeter 111 of the frame chosen by the user has been marked, shown diagrammatically by a rectangle. It can be appreciated that there are large areas with null or nearly null astigmatism which eventually will be removed during the bevelling process. Since when the progressive lens is designed, the frame that will eventually be chosen by the user is not known, and since the areas above the area of far vision 101 and under the area of near vision 103 can be very important in optical terms (because, if they lie inside perimeter 111 of the frame they will be areas used frequently by the user), the conventional design techniques of progressive lenses tend to keep top area 107 and bottom area 109 with the smallest astigmatism possible and, in general, with the smallest possible aberrations. However the reality is that a significant part of these top 107 and bottom 109 area will be removed during bevelling, specifically top outside area 119 and bottom outside area 123. Consequently, the conventional design techniques for progressive lenses are conditioned by trying to optimized the optical properties of areas that will be removed subsequently. The method of this invention provides the improvement of distinguishing between the area to be optimized 113 and outside area 115. This way, in this example, during the method according to the invention the astigmatisms associated with progression are redistributed as shown in FIG. 13. In other words, top outside area 119 and bottom outside area 123 are invaded with astigmatism which leads to a reduction in the maximum values of astigmatism present in the area to be optimized 113. Since in the end only central area 5 will remain, which includes the area to be optimized 113, the overall result is a bevelled lens with smaller astigmatism aberrations derived from progression. This is shown in FIG. 14.

The invention claimed is:

1. A method for designing an ophthalmic lens, which has one concave face and one convex face and an external perimeter, comprising:
   (a.i) taking physiological data and prescription data of a user's optical correction;
   (a.ii) selecting a frame, taking data of said frame, including the data of a perimeter of said frame, and taking data of positioning of the lens with respect to a user's eye, taking into account the selected frame;
   (b) defining a central area that has a central perimeter that coincides with the perimeter of said selected frame;
   (c) defining a temporal line that divides the central area into a nasal area and a temporal area, where the temporal line is outside an intersection between the convex face and a cone with an opening angle of at least 30°, an apex of which is in a center of rotation of the user's eye and an axis of which corresponds to an optical axis;
   (d) defining a useful perimeter formed by a combination of the nasal area of said central perimeter and said temporal line, and a useful area delimited by said useful perimeter;
   (e) establishing permissible thickness values for said central perimeter;
   (f) defining a surface to be machined on one of said concave and convex faces, so that said concave face and said convex face, together, comply with a certain, pre-established ophthalmic prescription in said useful area;
   (g) positioning said surface to be machined, provided on one of said concave and convex faces, with respect to the other of said concave and convex faces, so that said surface to be machined and the positioning of the surface to be machined with respect to the other of said concave and convex faces determines a thickness of the lens along said useful perimeter of said useful area, where any point in the nasal area of said central perimeter has a thickness that complies with the permissible thickness values; and
   (h) defining a transition area with a transition surface that extends between said useful perimeter of said useful area and said external perimeter, where said transition surface extends as a continuation of said surface to be machined and extends as far as said external perimeter, and where said transition surface is continual and its derivative is continuous on all points, including a joining line between said transition surface and said surface to be machined, and where said transition surface complies with the permissible thickness values in the step (e) on a point of the temporal area of the central perimeter.

2. The method according to claim 1 wherein said cone has an opening angle greater than 40°.

3. The method according to claim 1, wherein after said step (g), determining whether it is possible to move said temporal line in a temporal direction while still complying with said permissible thickness values and, if so, moving said temporal line in said temporal direction.

4. The method according to claim 1, wherein a transition area between said temporal line and said central perimeter is calculated by requiring that it be continuous and with continuous derivatives, and that it has on all points thereof a thickness that is within a pre-established range.

5. The method according to claim 1, wherein said lens is a progressive ophthalmic lens and comprises an area for far vision, an area for near vision and a corridor that extends between said area for far vision and said area for near vision, where between said area for far vision and a top edge of said lens there extends a top area and between said area for near vision and a bottom edge of said lens there extends a bottom area, including optimizing said lens, comprising:
(i) calculating objective values of a prescription power and an astigmatism for said area for far vision, said area for near vision and said corridor, according to said user's physiological and prescription data;
(ii) generating a predesigned lens, where said predesigned lens has certain lateral aberration values, in said top and bottom areas;
(iii) defining an area to be optimized, defined from said central perimeter, and an external area outside said central perimeter, and locating said area to be optimized in said lens, where said central perimeter divides said top area into a top outside area and a top inside area and said bottom area into a bottom outside area and a bottom inside area; and
(iv) redistributing at least one lateral aberration of the lens, where during said redistribution said at least one lateral aberration of the lens is distributed around said outside area allowing, at least one of said top outside and bottom outside areas, to adopt higher values to the ones it had in said predesigned lens.

6. The method according to claim 1, further comprising: machining said surface to be machined and said transition surface.

7. The method according to claim 6, further comprising at least partially concealing aberrations in an area between said temporal line and said temporal area of said central perimeter.

8. The method according to claim 7, wherein said concealing aberrations is a non-polishing, a tinting, a coating, a frosting or a combination thereof, applied to any of the two faces of the lens.

9. The method according to claim 8, wherein said frosting is performed by modifying any of the two surfaces of the lens or a surface of a coating of any of the two surfaces of said lens by a mechanical action.

10. The method according to claim 7, wherein said concealing aberrations is performed by superficially ablating said lens using impulses generated by a collimated energy source.

11. The method according to claim 7, wherein said concealing aberrations is performed by modifying internal optical properties of said lens by impulses generated by a collimated energy source.

12. The method according to claim 7, wherein said concealing aberrations is performed by making cavities inside said lens using impulses generated with a laser.

13. The method according to claim 6, further comprising at least partially disabling formation of images in an area between said temporal line and said temporal area of said central perimeter.

14. The method according to claim 13, wherein said disabling formation of images is a non-polishing, a tinting, a coating, a frosting or a combination thereof, applied to any of the two faces of said lens.

15. The method according to claim 13, wherein said disabling formation of images is performed by superficially ablating said lens using impulses generated by a collimated energy source.

16. The method according to claim 13, wherein said disabling formation of images is performed by modifying internal optical properties of said lens by impulses generated by a collimated energy source.

17. The method according to claim 13, wherein said disabling formation of images is performed by making cavities inside said lens using impulses generated with a laser.

18. The method according to claim 6, further comprising: bevelling according to said central perimeter.

19. A finished ophthalmic lens that has one concave face and one convex face and an external perimeter, comprising:
said external perimeter has a thickness within a pre-established range, including—
(a) a useful area where said concave face and said convex face comply with a specific, pre-established ophthalmic prescription and where one of said concave and convex faces defines a machined surface, where said useful area has a useful perimeter made up of a combination of a nasal area of a central perimeter, which coincides with a perimeter of a specific, pre-established frame that defines a central area, and a temporal line, which divides said central area into a nasal area and a temporal area where said temporal line is outside an intersection between said convex face and a cone with at least a 30° opening angle, an apex of which is in a center of rotation of a user's eye and an axis of which corresponds to an optical axis; and
(b) an outer transition area that joins said useful perimeter of said useful area to said external perimeter, where said outer transition area includes an outer transition surface that extends as a continuation of said machined surface and extends as far as said external perimeter, and where said transition surface is continuous and its derivative is continuous on all points, including a joining line between said outer transition surface and said machined surface.

20. The lens according to claim 19, further comprising:
an area between said temporal line and said temporal area of said central perimeter and having concealed aberrations.

21. The lens according to claim 20, wherein said area with the concealed aberrations is non-polished, tinted, coated, frosted or a combination thereof.

22. The lens according to claim 19, wherein the lens is a progressive lens, comprising:
an area for far vision, an area for near vision and a corridor that extends between said area for far vision and said area for near vision, where between said area for far vision and a top edge of said lens there extends a top area, and between said area for far vision and a bottom edge of said lens there extends a bottom area; and
an area to be optimized, defined from said central perimeter, and an area outside said central perimeter, where said central perimeter divides said top area into a top outside area and a top inside area and said bottom area into a bottom outside area and a bottom inside area,
wherein at least one of said top outside and bottom outside areas has an astigmatism associated with a progression of a power of the lens greater than 0.25 Dp.

* * * * *